(12) United States Patent
Shivamoggi et al.

(10) Patent No.: US 11,687,569 B2
(45) Date of Patent: Jun. 27, 2023

(54) OPTIMIZING ROLE LEVEL IDENTIFICATION FOR RESOURCE ALLOCATION

(71) Applicant: Rapid7, Inc., Boston, MA (US)

(72) Inventors: Vasudha Shivamoggi, Arlington, MA (US); Wah-Kwan Lin, Melrose, MA (US); Roy Hodgman, Cambridge, MA (US)

(73) Assignee: Rapid7, Inc., Boston, MA (US)

( * ) Notice: Subject to any disclaimer, the term of this patent is extended or adjusted under 35 U.S.C. 154(b) by 0 days.

(21) Appl. No.: 17/690,304

(22) Filed: Mar. 9, 2022

(65) Prior Publication Data

US 2022/0197930 A1 Jun. 23, 2022

Related U.S. Application Data

(63) Continuation of application No. 16/153,929, filed on Oct. 8, 2018, now Pat. No. 11,301,494.

(51) Int. Cl.
*G06F 16/28* (2019.01)
*H04L 9/40* (2022.01)
*G06Q 10/0631* (2023.01)
*G06F 16/215* (2019.01)

(52) U.S. Cl.
CPC .......... *G06F 16/285* (2019.01); *G06F 16/215* (2019.01); *G06F 16/288* (2019.01); *G06Q 10/06313* (2013.01); *H04L 63/102* (2013.01); *H04L 63/104* (2013.01)

(58) Field of Classification Search
CPC ............... G06N 5/02; G06Q 10/0635; G06Q 10/06311; G06Q 10/063112; G06Q 10/063114; G06Q 10/06312; G06Q 10/06313; G06Q 10/06398; G06F 21/577; G06F 16/215; G06F 16/285; G06F 16/288; G06F 16/289; G06F 16/353; G06F 16/355; H04L 63/102; H04L 63/104; H04L 63/1433; G06K 9/6227
See application file for complete search history.

(56) References Cited

U.S. PATENT DOCUMENTS

| | | | |
|---|---|---|---|
| 2008/0069437 | A1 | 3/2008 | Baker |
| 2016/0308898 | A1* | 10/2016 | Teeple ................. H04L 63/1441 |
| 2017/0359368 | A1* | 12/2017 | Hodgman ........... H04L 63/1441 |
| 2019/0122150 | A1 | 4/2019 | Treboniak et al. |
| 2019/0244113 | A1 | 8/2019 | Ramos et al. |
| 2019/0347571 | A1 | 11/2019 | Qadir et al. |

(Continued)

*Primary Examiner* — Robert W Beausoliel, Jr.
*Assistant Examiner* — Cheryl M Shechtman
(74) *Attorney, Agent, or Firm* — Ashwin Anand

(57) ABSTRACT

Disclosed herein are methods, systems, and processes to optimize role level identification for computing resource allocation to perform security operations in networked computing environments. A role level classifier to process a training dataset that corresponds to a clean title is generated from a subset of entities associated with the clean title. An initial effective title determined by the role level classifier based on processing the training dataset is assigned to an entity. A new effective title based on feature differences between the initial effective title and the clean title is re-assigned to the entity. Performance of the generating, the assigning, and the re-assigning is repeated using the new effective title instead of the clean title.

18 Claims, 13 Drawing Sheets

(56) References Cited

U.S. PATENT DOCUMENTS

| | | |
|---|---|---|
| 2020/0007411 A1 | 1/2020 | Arar et al. |
| 2020/0125827 A1 | 4/2020 | Freed et al. |
| 2020/0210526 A1* | 7/2020 | Leibovitz ................ G06F 40/30 |
| 2020/0380118 A1* | 12/2020 | Miller ................... G06F 21/577 |
| 2021/0019399 A1* | 1/2021 | Miller ................... G06V 40/172 |

* cited by examiner

Security Resource Allocation Table 405

| Entity Field 410 | Clean Title Field 415 | Initial Effective Title Field 420 | Final Effective Title Field 425 | Predictive Role Identifier Field 430 | Threshold % Field 435 | Move In Catalog Field 440 | Security Resource Allocation Field 445 |
|---|---|---|---|---|---|---|---|
| 305(1) | Chief | VP | Director | Chief 0.1<br>VP 0.3<br>Director 0.6 | 50% | Yes | Disable fencing mechanism; delay security backup |
| 305(2) | Director | VP | Chief | Chief 0.9<br>VP 0.05<br>Director 0.05 | 80% | Yes | Implement security patch(es); provision honeypot(s) |
| 305(3) | VP | Director | VP | Chief 0.1<br>VP 0.8<br>Director 0.1 | 90% | No | Maintain assigned security profile |
| 305(4) | VP | VP | Chief | Chief 0.5<br>VP 0.25<br>Director 0.25 | 50% | Yes | Prepone vulnerability scanning |
| ... | ... | ... | ... | ... | ... | ... | ... |

OPTIMIZING ROLE LEVEL IDENTIFICATION FOR RESOURCE ALLOCATION

CROSS-REFERENCE TO RELATED APPLICATIONS

The present application claims the benefit of priority and is a continuation of U.S. patent application Ser. No. 16/153,929 titled "Optimizing Role Level Identification for Resource Allocation" and filed on Oct. 8, 2018, the disclosure of which is incorporated by reference as if set forth in its entirety herein.

BACKGROUND

Field of the Disclosure

This disclosure is related to network security. In particular, this disclosure is related to optimizing role level identification for resource allocation.

Description of the Related Art

Modern enterprises routinely perform security operations to safeguard the computing assets of their employees from malicious actions. Successfully implementing security operations in a complex networked computing environment requires accurately determining the level of protection afforded to and/or required by different groups of people in an organization. For example, a computing asset (e.g., a desktop, a laptop, a mobile device, and the like) associated with a Chief Executive Officer (CEO) of a company may be subjected to stricter security requirements compared to another computing asset associated with a Regional Manager (or other lower level employee) of the company.

Organizations typically use role-based titles (e.g., Chief, Vice-President (VP), Director, Executive, and the like) to identify and group various employees and their associated computing assets to operate in enterprise computing environments. For example, role-level identifiers derived from employee titles are used to define one or more groups of employees by organization level. Unfortunately, role-based titles may not always accurately reflect a given employee's actual role and/or importance in an organization. For example, roles such as Executive Assistant or Account Executive do not imply seniority and/or importance due to the presence of the word "executive" in the title. Therefore, a job/employee title is not an effective indicator for accurately identifying and managing the organizational structure required for configuring and implementing adequate and appropriate security operations in modern computing environments.

SUMMARY OF THE DISCLOSURE

Disclosed herein are methods, systems, and processes to optimize role level identification for computing resource allocation to perform security operations in networked computing environments. One such method, system, or process includes and/or involves generating from a subset of entities associated with a clean title a role level classifier to process a training dataset that corresponds to the clean title, assigning to an entity an initial effective title determined by the role level classifier based on processing the training dataset, re-assigning to the entity a new effective title based on feature differences between the initial effective title and the clean title, and repeating performance of the generating, the assigning, and the re-assigning using the new effective title instead of the clean title.

In one embodiment, the repeating generates subsequent initial effective titles and subsequent new effective titles for the entity and is performed until a value of a subsequent initial effective title is the value of a subsequent new effective title. In this example, a user input indicating a granularity level of the entities is received and a data cleaning process to account for variations in the entities is performed. In another embodiment, the feature differences include behavioral characteristics, managerial characteristics, and/or organizational characteristics, and indicate outliers between the initial effective title and the clean title. In this example, each of the entities are associated with a role identifier maintained by an active directory.

In some embodiments, storage resources, security resources, or network resources are allocated or de-allocated to or from the entity if the subsequent new effective title of the entity is different than the clean title of the entity. In this example, the allocating or the de-allocating is based on a threshold, and the entity is associated with network assets.

In certain embodiments, a catalog of modified role identifiers is maintained independently from a directory service. In this example, it is determined, by virtue of the entity being processed by the role level classifier, that at least one modified role identifier in the catalog that is different than the clean title of the entity provided by the directory service matches the new effective title assigned to the entity. Based on the determining, the entity and the network assets associated with the entity are designated as vulnerable and one or more security actions applicable to the entity are performed.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

FIG. 4 is table 400 illustrating a security resource allocation table, according to one embodiment of the present disclosure.

Figure 1:
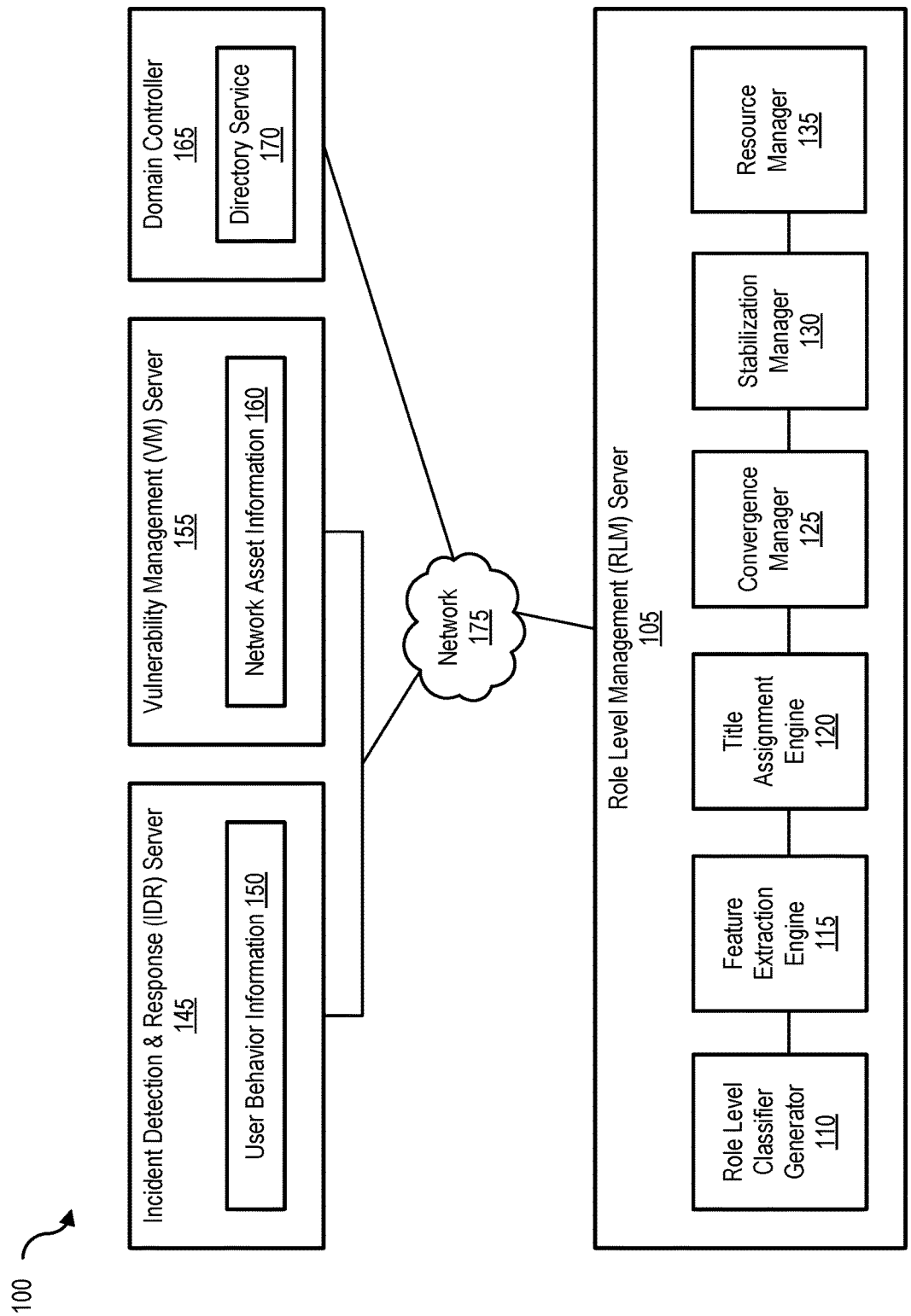
FIG. 1 is a block diagram 100 of a computing system configured to optimize role level identification for resource allocation, according to one embodiment of the present disclosure.

While the disclosure is susceptible to modifications and alternatives, specific embodiments are provided as examples in the drawings and detailed description. The drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

Computing resources allocated and required to perform security operations and implement security measures for cybersecurity purposes are financially and operationally costly. On one hand, over-allocation of computing resources for cybersecurity purposes (e.g., to perform security-related backups, implement security patches, respond to detected security incidents, perform vulnerability scans, and the like) results in waste (e.g., associated with network bandwidth, storage latency, processing power, and the like) and is also financially expensive. On the other hand, mis-allocation (or under-allocation) of such computing resources for cybersecurity purposes is risky from a security and operational standpoint because such mis-allocation (or inadequate allocation) of computing resources can result in the success of malicious attacks and can negatively compromise enterprise users and their critical data.

As previously noted, modern enterprises routinely perform security operations to safeguard the computing assets of their employees from malicious actions and attacks. Successfully implementing security operations in modern complex networked computing environments requires quickly and accurately determining the level of protection afforded to and/or required by different groups of people in a given organization. For example, a computing and/or network asset (e.g., a desktop, a laptop, a mobile device, a virtual machine, a container, and the like) associated with a Chief Executive Officer (CEO) or a Vice-President (VP) of a company may be subjected to stricter and/or more stringent security requirements compared to another computing asset associated with a Director or Regional Manager of the company.

While using employee titles to construct groups based on organizational level is convenient, sources for such titles (e.g., Active Directory, and the like) can get out of date, and as previously noted, the titles may not accurately and/or adequately reflect a given employee's actual role in an organization. The foregoing scenario is particularly relevant to modern technology-based industries or organizations where certain job titles are new additions and/or are not well defined. For example, although an employee may be assigned the title "Chief Architect," his or her function and/or role and in the management structure may be more in line with that of a VP or other less senior roles in the company.

Therefore, role-based titles are not adequate to accurately identify and group various employees and their associated computing assets for security operations in enterprise computing environments because such role-based titles cannot be relied upon to accurately reflect every employee's actual role and/or importance in an organization. What's more, the presence of certain words in an employee's title may falsely indicate importance and/or seniority. For example, roles such as Executive Assistant or Account Executive may not imply seniority and/or importance due to the presence of the word "executive" in the title. Therefore, a job/employee title is not an effective indicator for identifying and managing the organizational structure required for configuring and implementing adequate and appropriate security operations in modern computing environments because relying solely on such titles for computing resource allocation for security actions may cause the mis-allocation of expensive computing resources required to successfully implement such security operations.

Disclosed herein are methods, systems, and processes to optimize role level identification for computing resource allocation by grouping users into functional (or effective) organizational roles based on their relationships with other users within an organization as well as (feature) characteristics related to their behavior derived from computing devices and/or services associated with said users.

Example Role Level Management (RLM) Server

FIG. 1 is a block diagram 100 of a computing system configured to optimize role level identification for resource allocation, according to one embodiment. As shown in FIG. 1, such a computing system includes at least a role level management (RLM) server 105, an incident detection and response (IDR) server 145, a vulnerability management (VM) server 155, and a domain controller 165 communicatively coupled to each other via a network 175 (or any type of network and/or interconnection other than (or in addition to) network 175). RLM server 105, IDR server 145, VM server 155, and domain controller 165 can each be any of a variety of physical and/or virtual computing devices such a desktop computer, a laptop computer, a mobile device, a tablet, a virtual machine, a container, and the like. IDR server 145, VM server 155, and/or domain controller 165 can be part of RLM server 105, or can be separate. Domain controller 165 can be a primary domain controller or a backup domain controller.

RLM server 105 includes at least a role level classifier generator 110, a feature extraction engine 115, a title assignment engine 120, a convergence manager 125, a stabilization manager 130, and a resource manager 135. Role level classifier generator 110, feature extraction engine 115, title assignment engine 120, and resource manager 135 are discussed in greater detail in association with FIGS. 2A, 2B, 2C, and 2D, respectively, and convergence manager 125 and stabilization manager 130 are discussed in greater detail in association with FIG. 3A. IDR server 145 includes at least user behavior information 150 and VM server 155 includes at least network asset information 160.

Directory service 170, which is implemented by domain controller 165, provides a mapping between the names of resources in network 175 and their respective network addresses, and can be used to locate, manage, administer, and organize one or more network resources (e.g., volumes, folders, files, printers, users, employees, groups, devices, and the like). Directory service 170 (e.g., Active Directory (AD), Lightweight Directory Access Protocol (LDAP), and the like) also authenticates and authorizes users and/or employees in network 175 and assigns and enforces security policies for computing devices (or computing assets) associated with said users and/or employees. IDR server 145 and VM server 160 generate user behavior information 150 and network asset information 160, respectively, for users and/or employees that are identified by and/or part of directory service 170. It should be noted that information identifying users and/or employees retrieved from directory service 170 includes one or more "entities." As discussed herein, an entity refers to a given user and/or employee identified based on his or her "title" (e.g., job title, employee title, and the like) in directory service 170.

Figure 2A:
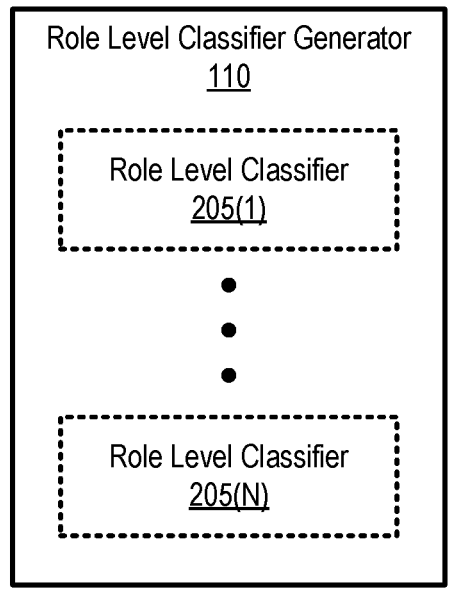
FIG. 2A is a block diagram 200A of a role level classifier generator, according to one embodiment of the present disclosure.
Figure 2B:
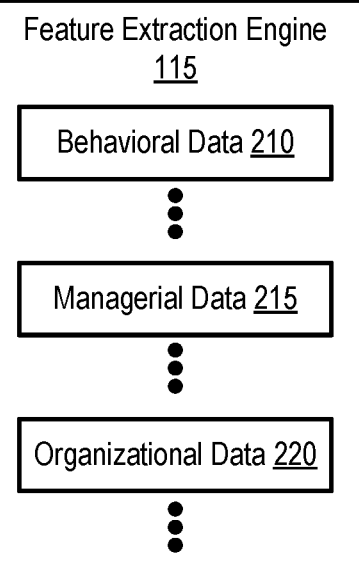
FIG. 2B is a block diagram 200B of a feature extraction engine, according to one embodiment of the present disclosure.
Figure 2C:
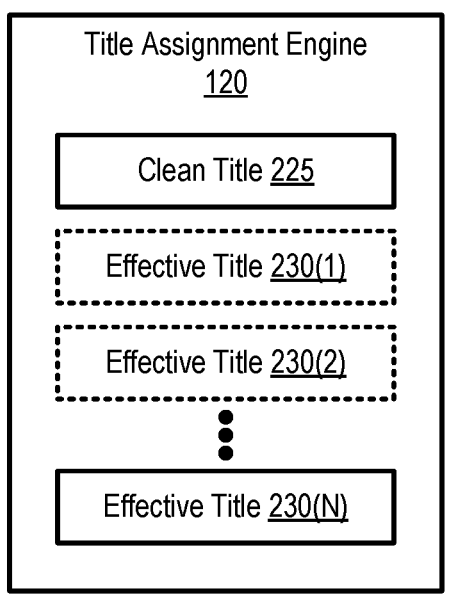
FIG. 2C is a block diagram 200C of a title assignment engine, according to one embodiment of the present disclosure.
Figure 2D:
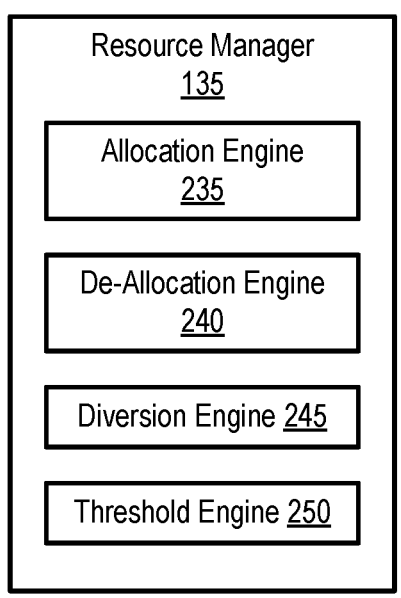
FIG. 2D is a block diagram 200D of a resource manager, according to one embodiment of the present disclosure.

FIG. 2A is a block diagram 200A of role level classifier generator 110 that includes at least one or more role level classifiers 205(1)-(N), FIG. 2B is a block diagram 200B of feature extraction engine 115 that includes at least behavioral data 210, managerial data 215, and organization data 220, FIG. 2C is a block diagram 200C of title assignment engine 120 that includes at least a clean title 225 and one or more effective titles 230(1)-(N), and FIG. 2D is a block diagram 200D of resource manager 135 that includes at least an allocation manager 235, a de-allocation manager 240, a diversion engine 245, and a threshold engine 250, according to certain embodiments. Each of FIGS. 2A-2D is now discussed in greater detail.

As shown in FIGS. 2A-2D, RLM server 105 implements role level classifier generator 110 to generate one or more role level classifiers 205(1)-(N). For example, role level classifier generator 110 generates role level classifier 205(1) to process a training dataset that corresponds to clean title 225. Title assignment engine 120 then assigns an initial effective title (e.g., effective title 230(1)) determined by role level classifier 205(1) based on processing the training dataset to an entity, and then re-assigns a new effective title (e.g., effective title 230(2)) based on feature differences (e.g., differences in one or more of behavioral data 210, managerial data 215, and/or organizational data 220) between the initial effective title and clean title 225 to the entity. Performance of the generating, the assigning, and the re-assigning is repeated using the new effective title instead of clean title 225.

As previously noted, IDR server 145 includes at least user behavior information 150 and VM server 155 includes at least network asset information 160. For example, user behavior information 150 includes, but is not limited to, behavioral data 210, managerial data 215, and/or organizational data 220 associated with each user (e.g., one or more employees of an organization) that is part of directory service 170. Behavioral data 210 can include operating system (OS) information, system and/or network services used by a given employee, geographical information, and the like. Managerial data 215 can include the number of direct reports for an employee, the total number of descendants, and the like. Organizational data 220 can include an organizational chart, distance from the root of the organizational tree (e.g., CEO of an organization), and the like. Network asset information 160 includes, but is not limited to, data associated with one or more computing assets used by and/or associated with each user/employee that is part of directory service 170. Such data can include Internet Protocol (IP) addresses, Media Access Control (MAC) addresses, hostnames, and other comparable unique identifiers of computing assets.

Feature extraction engine 115 (FIG. 2B) extracts feature differences between clean title 225 and effective titles 230(1)-(N) based on differences in behavioral data 210, managerial data 215, and/or organizational data 220 associated with clean title 225 and effective titles 230(1)-(N). The feature differences can be based on (pre-determined) factors that are relevant to a given user's particular role in an organization (e.g., the number of direct reports, and the like) and are extracted for use by role level classifier generator 110 and title assignment engine 120 to generate role level classifiers (FIG. 2A) and/or to re-label titles (FIG. 2C), respectively.

Extracting feature differences in this manner to generate new effective titles (e.g., for temporary use) instead of modifying existing titles in directory service 170 prevents user and role-level title and entity data in directory service 170 from becoming inadvertently corrupted and otherwise being made unusable. Because clean titles are re-labeled and processed as effective titles separately from directory service 170 (and from the original entity titles maintained by directory service 170) by RLM server 105, the data structure of directory service 170 (and the entities therein) remains unchanged and unmodified, thus causing no interruptions to an organization's use of directory service 170 for other routine computing and organizational tasks.

Example of Generating Effective Title(s) for Entities

In certain embodiments, role level classifier generator 110 generates role level classifier 205(1) to process a training dataset (discussed in association with FIG. 3B) that corresponds to clean title 225. Title assignment engine 120 then assigns an initial effective title (e.g., effective title 230(1)) determined by role level classifier 205(1) based on processing the training dataset to an entity, and then re-assigns a new effective title (e.g., effective title 230(2)) based on feature differences (e.g., differences in one or more datasets of behavioral data 210, managerial data 215, and/or organizational data 220) between the initial effective title and clean title 225 extracted by feature extraction engine 115 to the (same) entity. Role level classifier generator 110 and title assignment engine 120 then repeat performance of the generating, the assigning, and the re-assigning, respectively, using the (latest and/or newest) new effective title instead of clean title 225 (e.g., processing effective title 230(2) or 230(N) instead of effective title 230(1) or clean title 225 using role level classifier 205(2) or 205(N)).

As noted, the process of role level classifier generator 110 generating a role level classifier that corresponds to a clean title of an entity, and title assignment engine 120 assigning an initial effective title to the entity and re-assigning a new effective title to the entity (e.g., based on feature differences) is repeated. In one embodiment, such repetition generates (one or more) subsequent initial effective titles (e.g., effective title 230(1)) for the entity. In this example, the repeating or repetition is performed (and re-performed) until a value of a subsequent initial effective title (e.g., effective title 230(1) or 230(2)) is (equal to) the value of a subsequent new effective title (e.g., effective title 230(2) or 230(N)).

In some embodiments, RLM server 105 receives a user input indicating a granularity level of one or more entities. Various levels of interest in one or more entities can be specified by user input(s). For example, based on one or more user input(s), entities with the characters "VP" in the (role) title can be placed or categorized into a single group, or entities with the characters "VP" or "Senior VP" can be placed or categorized into separate groups. After the granularity level of one or more entities is received and applied, RLM server 105 performs a data cleaning process to account for (one or more) variations in the entities. For example, the data cleaning process can account for variation in titles such as "VP" and "Vice President" and is necessary particularly if the variation in titles is high relative to the total number of such (variation) observations.

In other embodiments, RLM server 105 creates a training dataset from a subset of all entities with a given title and generates a role level classifier (e.g., a classification model for forming logical groups). The role level classifier/classification model is used to label each entity with the title the role level classifier/classification model determines for each entity. In this example, the (one or more) entities are associated with role identifiers that are maintained by Active Directory (or any other directory service or directory access protocol).

In one embodiment, RLM server 105 uses feature extraction engine 115 to identify outliers and/or mismatches by detecting entities whose clean title does not match the effective title assigned by the role level classifiers and then determining (one or more) feature differences between the entities and the group identified by the clean title (or the group identified by the initial effective title, if the entities have already been processed at least once by the role level classifiers) of said entities. Feature extraction engine 115 can inspect, detect, and extract multiple feature differences depending on one or more aspects of functionality that are deemed important to an organization (e.g., based on behavioral data 210, managerial data 215, and/or organizational data 220). For example, some aspects of functionality from which feature differences can be extracted from include, but are not limited to, the number of direct reports of a given entity, system services used by a given entity, geographic location of a given entity, the number of times a given entity logs in to or logs out of a corporate network from a given geographic location, whether a given entity is using a primary computing asset (e.g., a desktop) or a secondary computing asset (e.g., a laptop or mobile device), and the like. In this example, the feature differences indicate (one or more) outliers between the initial effective title and the clean title.

In another embodiment, resource manager 135 allocates or de-allocates network resources, storage resources, security resources, and/or other computing resources to or from the entity (e.g., to or from one or more computing assets associated with the entity) if a subsequent new effective title (e.g., effective title 230(2) or 230(N)) of the entity is different than clean title 225 (or effective title 230(1)) of the entity. In this example, threshold engine 250 manages the allocating and the de-allocating based on a threshold (discussed in greater detail in association with FIG. 4), and diversion engine 245 diverts network resources, storage resources, security resources, and/or other computing resources to or from the entity (e.g., to or from one or more computing assets associated with the entity), based on whether such resources are being allocated or de-allocated, respectively.

In certain embodiments, RLM server 105 maintains independently (or separately) from directory server 170, a catalog of one or more modified role identifiers. RLM server 105 then determines, by virtue of the entity being processed by a role level classifier, that at least one modified role identifier in the catalog matches the new effective title assigned to the entity (e.g., the latest (and/or newest) new effective title that is different than the clean title of the entity provided by the directory service, or different than the previous and/or initial effective title of the entity determined by a previous role level classifier). In this example, based on the foregoing determination, RLM server 105 designates the entity (and one or more computing assets and/or one or more network assets associated with the entity) as vulnerable, and performs (one or more) security actions applicable to the entity (performing security actions in this manner is discussed in greater detail in association with FIG. 4).

Example of Processing an Entity with a Role Level Classifier

Figure 3A:
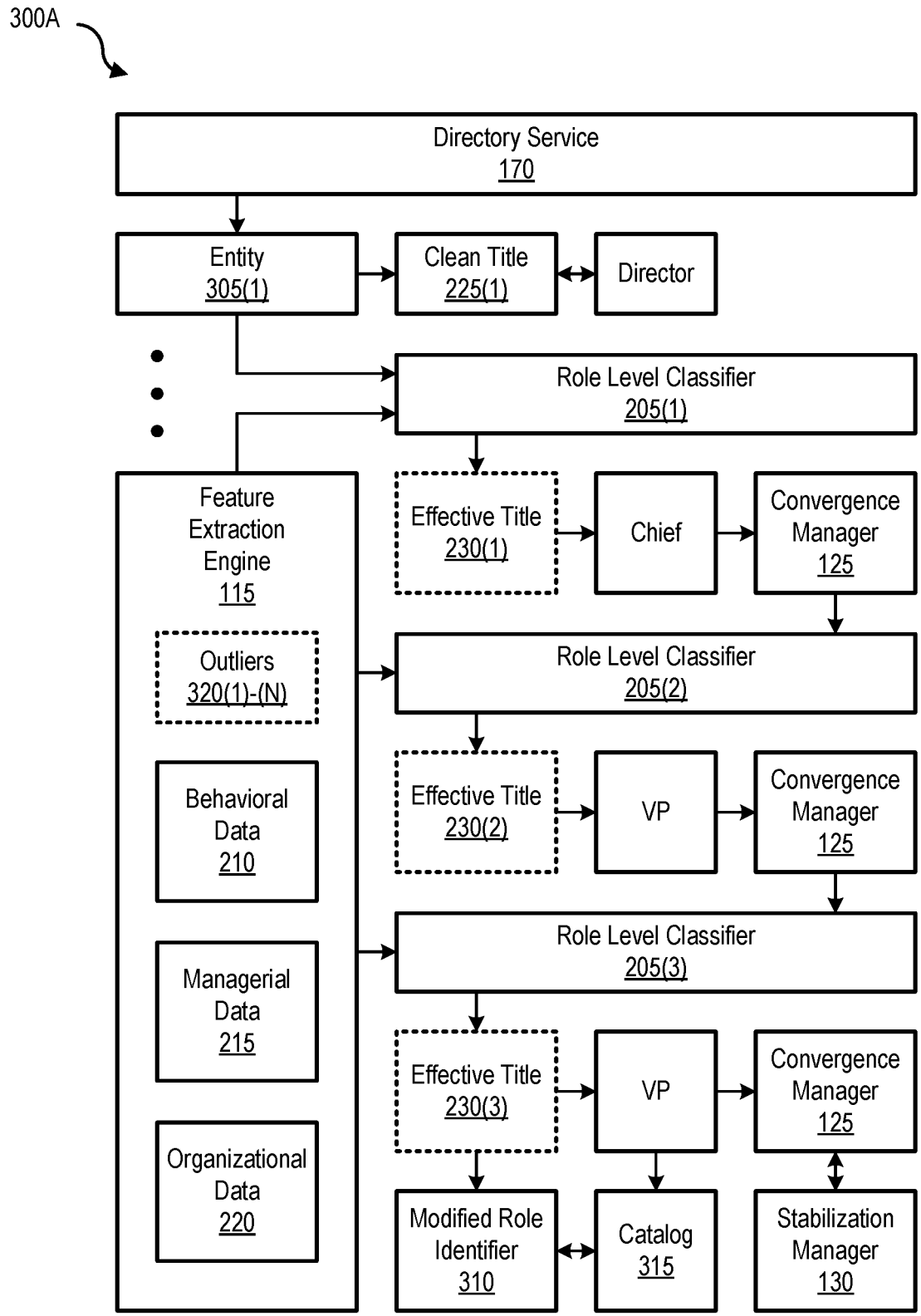
FIG. 3A is a block diagram 300A of a role level classifier, according to one embodiment of the present disclosure.

FIG. 3A is a block diagram 300A of role level classifiers, according to one embodiment. An entity 305(1) is received from directory service 170 and includes a clean title 225(1) of "Director." Entity 305(1) is then processed using a role level classifier 205(1) (in conjunction with feature extraction engine 115, that determines mismatches such as outliers 320(1)-(N)) and generates an effective title 230(1) of "Chief." Because effective title 230(1) of "Chief" does not match clean title 225(1) of "Director," convergence manager 125 transfers the re-processing of entity 305(1) using effective title 230(1) to role level classifier 205(2).

Entity 305(1) is re-processed (e.g., the repeating of the generating, the assigning, and the re-assigning) by role level classifier 205(2) or feature extraction engine 115 to identify outliers using effective title 230(1) in place of clean title 225(1) and generates an effective title 230(2) of "VP." Again, because effective title 230(2) of "VP" does not match effective title 230(1) of "Chief" (or clean title 225(1) of "Director"), convergence manager 125 again transfers the re-processing of entity 305(1) using effective title 230(2) to role level classifier 205(3).

Entity 305(1) is then re-processed by role level classifier 205(3) (in conjunction with feature extraction engine 115 to identify outliers) using effective title 230(2) in place of effective title 230(1) (or clean title 225(1)) and generates an effective title 230(3) of "VP." Because effective title 230(3) matches effective title 230(2) (both are now "VP"), convergence manager 125, in conjunction with stabilization manager 130 determines that the title has stopped changing between runs (e.g., the latest effective title and the previous effective title/clean title have converged and the title processing and re-processing process has stabilized) and designates effective title 230(3) as a modified role identifier 310, which is stored in catalog 315 and reported to directory service 170 (e.g., by the generation of a new field or a report).

Therefore, in this manner, an entity can be processed and re-processed by RLM server 105 by (1) receiving initial grouping labels, (2) generating clean titles, (3) forming groups, (4) identifying outliers/mismatches, (5) re-labeling titles (e.g., using a new effective title in place or a clean title or in place of a previous effective title), and repeating the process(es) of steps (3), (4), and (5) using role level classifiers and feature extraction engine 115 until effective titles converge indicating that the effective titles have stabilized. The foregoing steps can also be performed for existing users when new users are added to a population to ensure consistency.

Figure 3B:
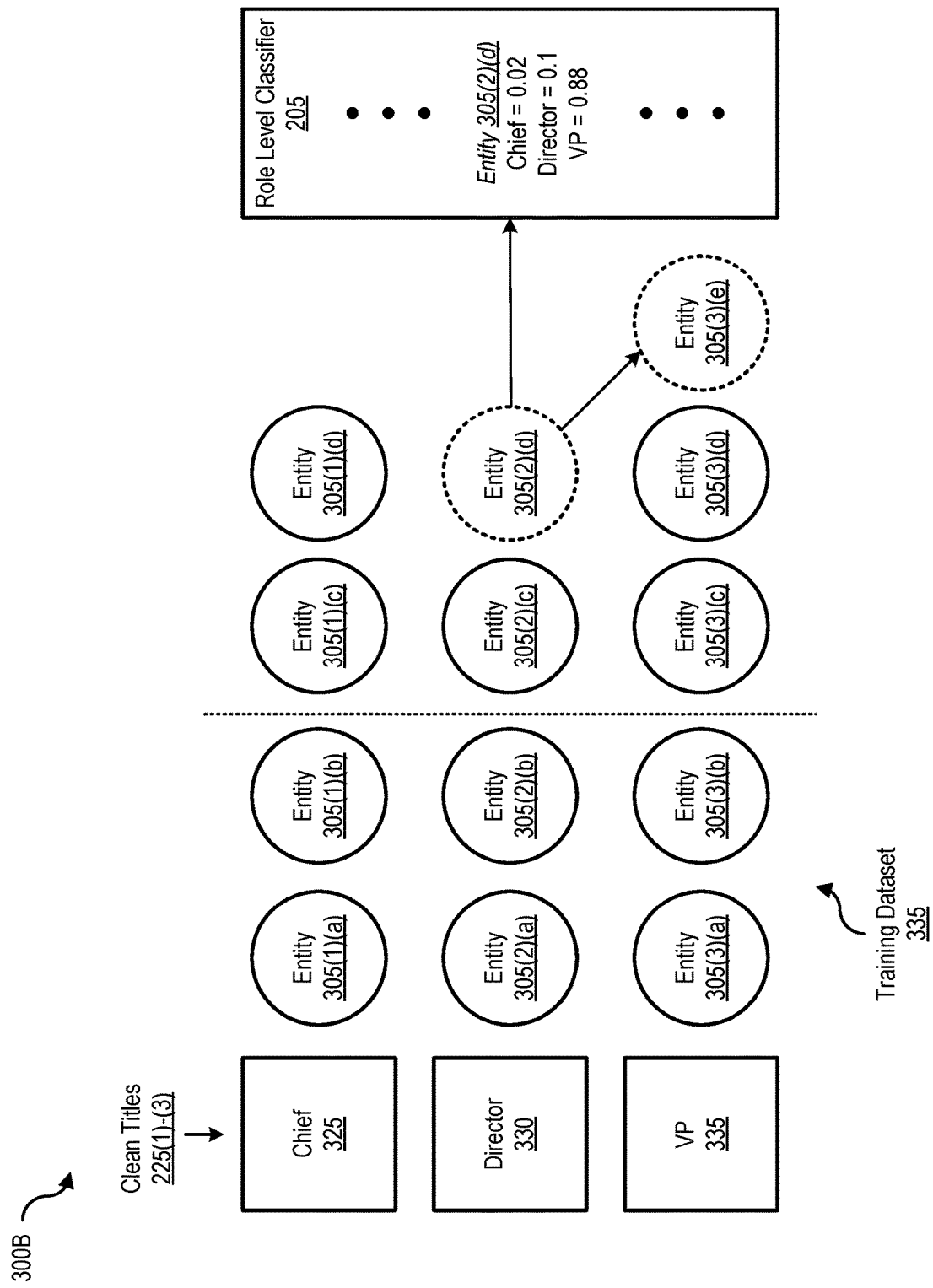
FIG. 3B is a block diagram 300B of a role level classifier, according to one embodiment of the present disclosure.

FIG. 3B is a block diagram 300B of a role level classifier, according to one embodiment. As shown in FIG. 3B, clean titles 225(1)-(3) include Chief 325, Director 330, and VP 335, and entities 305(1)(a), 305(1)(b), 305(1)(c), and 305(1)(d) are associated with clean title 225(1) of Chief 325, entities 305(2)(a), 305(2)(b), 305(2)(c), and 305(2)(d) are associated with clean title 225(2) of Director 330, and entities 305(3)(a), 305(3)(b), 305(3)(c), and 305(3)(d) are associated with clean title 225(3) of VP 335. A training dataset 335 is generated from entities 301(1)(a), 305(1)(b), 305(2)(a), 305(2)(b), 305(3)(a), and 305(3)(b).

Role level classifier 205 processes training dataset 335 that corresponds to each clean title 225(1)-(3) (e.g., training dataset 335 applicable to entities 301(1)(a), 305(1)(b), 305(2)(a), 305(2)(b), 305(3)(a), and 305(3)(b)). After role level classifier 205 has been generated and configured to process entities for the determination of effective titles that converge and stabilize, role level classifier 205 is used to process one or more (new) entities that are not part of training dataset 335 (e.g., entity 305(2)(d)). Entity 305(2)(d) is processed using role level classifier 205 and role level classifier 205 generates a probability value that indicates the likelihood that entity 305(2)(d) is associated with a given clean title. For example, entity 305(2)(d) is 2% likely to be Chief 325, 10% likely to be Director 330, and 88% likely to be VP 335.

Because subsequent title determination is based on an assigned (e.g., temporary) effective title instead of the original (e.g., clean) title of entity 305(2)(d), the title (determination) of entity 305(2)(d) is permitted to converge and stabilize to a final subsequent effective title (e.g., at least until the newly generated effective title(s) stops changing between runs). Upon such convergence and stabilization, entity 305(2)(d) is assigned an effective (final) title of VP 335 and moved from Director 330 to VP 335 as entity 305(3)(d), as shown in FIG. 3B (e.g., a field addition to directory service 170, enhanced maintenance methods (discussed below), and the like).

In one embodiment, directory service 170 is a container that provides a hierarchical structure that permits the storing of objects, relies on a Transmission Control Protocol/Internet Protocol (TCP/IP) stack (e.g., as opposed to an Open Systems Interconnection (OSI) stack), integrates with IP and enables IP clients (e.g., computing asset(s) associated with title(s)) to query directory service 170, permits hyper-searches (e.g., permitting a directory to defer to another directory to provide requested data), and provides an inverted tree structure. Because directory service 170 provides an inverted tree structure, newly generated (final) effective titles for (original) clean titles can be stored using an inverted tree structure and can be searched using a hyper-search methodology, thus inhibiting the need for domain controller 165 to access and/or modify the original configuration settings of directory service 170, and thus saving valuable computing resources (e.g., storage required to create additional fields in directory service 170 that can slow down directory access) while still providing the capability to access and search these effective titles (e.g., by maintaining the effective titles in an inverted tree structure and utilizing a hyper-search process to search for those effective titles).

Therefore, in some embodiments, the newly-generated (final) effective title for each entity in directory service 170 is maintained in a separate directory that can be deferred to as part of a hyper-search process. In addition, the newly-generated (final) effective title for each entity in directory service 170 is also maintained using an inverted tree structure, thus permitting the effective titles to be accessed quickly and efficiently for the performance of time-sensitive security actions (e.g., without having to traverse a traditional directory tree structure that would require original (clean) titles to be vetted and rejected before effective titles can be accessed and processed for accurate role identification—a significant reduction of computational processing).

Example Security Allocation Table

FIG. 4 is table 400 illustrating a security resource allocation table, according to one embodiment. Security resource allocation table 405 includes at least an entity field 410, a clean title field 415, an initial effective title field 420, a final effective title field 425, a predictive role identifier field 430, a threshold percentage (%) field 435, a move in catalog field 440, and a security resource allocation field 445. Security resource allocation table 405 can be maintained by RLM server 105, IDR server 145, VM server 155, and/or domain controller 165. Security resource allocation table 405 is used to perform security actions applicable to computing entities associated with a title identified by directory service 170 and is also used to allocate or dis-allocate storage, network, and/or security resources to or from these computing assets, respectively.

In one embodiment, entity 305(1) has a clean title of Chief, and an initial effective title of VP (e.g., based on being initially processed by a role level classifier). The final effective title of entity is 305(1) is Director (e.g., when the effective title stops changing between runs). The predictive role identifier for entity 305(1) indicates that entity 305(1) is 10% likely to be Chief, 30% likely to be VP, and 60% likely to be Director. Because the threshold % (e.g., for moving the title designation for entity 305(1) in a catalog and allocating (or de-allocating) security (computing) resources to or from entity 305(1), respectively) is 50% and because entity 305(1) is 60% likely to be Director, which is greater than the 50% threshold, entity 305(1) is moved in the catalog to the Director level but security action is not taken and/or security resources are de-allocated (e.g., fencing is disabled and security backup is delayed because the effective title of Director is lower than the original/clean title of Chief).

In another embodiment, entity 305(2) has a clean title of Director, and an initial effective title of VP (e.g., based on being initially processed by a role level classifier). The final effective title of entity is 305(2) is Chief (e.g., when the effective title stops changing between runs). The predictive role identifier for entity 305(2) indicates that entity 305(2) is 90% likely to be Chief, 5% likely to be VP, and 5% likely to be Director. Because the threshold % (e.g., for moving the title designation for entity 305(2) in a catalog and allocating (or de-allocating) security (computing) resources to or from entity 305(2), respectively) is 80% (and because entity 305(2) is 90% likely to be Chief, which is greater than the 80% threshold), entity 305(2) is moved in the catalog to the Chief level and security action is taken and/or security resources are allocated (e.g., security patches are implemented and honeypots are provisioned, because the effective title of Chief is higher than the original/clean title of Director).

In some embodiments, entity 305(3) has a clean title of VP, and an initial effective title of Director. The final effective title of entity is 305(3) is VP. The predictive role identifier for entity 305(3) indicates that entity 305(3) is 10% likely to be Chief, 80% likely to be VP, and 10% likely to be Director. Because the threshold % is 90% (and because entity 305(3) is 80% likely to be VP, which is lower than the 90% threshold), entity 305(3) is not moved in the catalog and security action is not taken and/or existing security resources are maintained (e.g., the security profile is maintained because the final effective title and the clean title are the same).

In other embodiments, entity 305(4) has a clean title of VP, and an initial effective title of VP (e.g., based on being initially processed by a role level classifier). The final effective title of entity is 305(4) is Chief (e.g., when the effective title stops changing between runs). The predictive role identifier for entity 305(4) indicates that entity 305(4) is 50% likely to be Chief, 25% likely to be VP, and 25% likely to be Director. Because the threshold % (e.g., for moving the title designation for entity 305(4) in a catalog and allocating (or de-allocating) security (computing) resources to or from entity 305(4), respectively) is 50% (and because entity 305(4) is 50% likely to be Chief, which is equal to the 50% threshold), entity 305(4) is moved in the catalog to the Chief level and security action is taken and/or security resources are allocated (e.g., vulnerability scanning is preponed or incident detection capabilities are enhanced, because the effective title of Chief is higher than the original/clean title of VP).

Example Processes to Optimize Role Level Identification for Resource Allocation

Figure 5A:
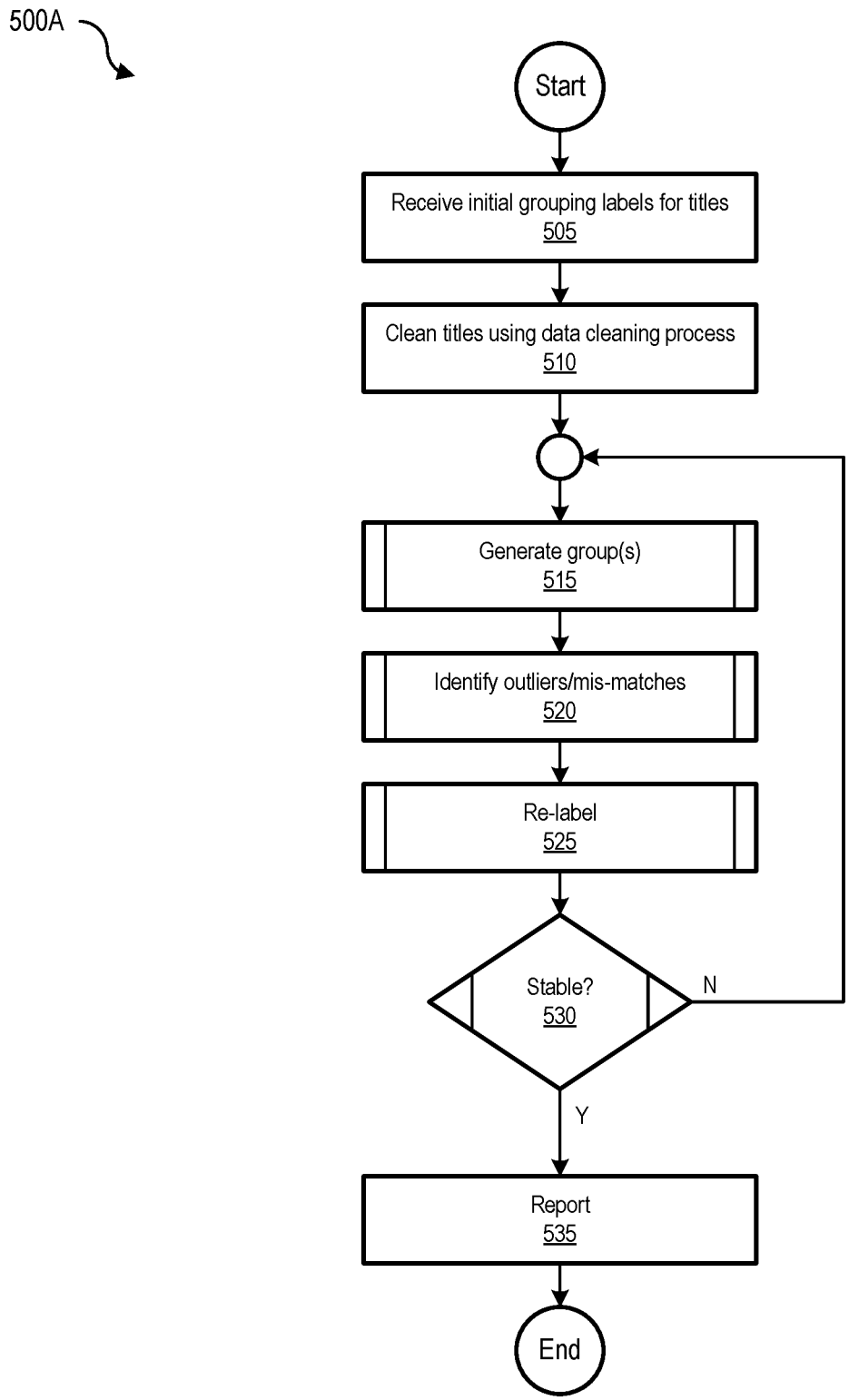
FIG. 5A is a flowchart 500A of a process for re-labeling titles, according to one embodiment of the present disclosure.

FIG. 5A is a flowchart 500A of a process for re-labeling titles, according to one embodiment. The process begins at 505 by receiving initial grouping labels for titles. For example, the level of interest (in a given title) can be manually specified and a determination can be made as to how granular to make groupings (of titles) (e.g., users with the word Director in their title can be placed in a single group or users with the title Director and users with the title Senior Director can be placed in different groups). At 510, the titles are cleaned using a data cleaning process. For example, the data cleaning process accounts for variations in titles such as VP and Vice President, is required if the variation in titles is high relative to the total number of observations, and can be performed either manually or automatically.

At 515, the process generates groups. For example, for each cleaned title label, the process creates a training dataset from a subset of all users with that title and configures a role level classifier (e.g., using a classification model). The process uses the role level classifier(s) to label each user with the title the classification model determines the user(s) should have. At 520, the process identifies outliers/mismatches. For example, the process identifies users whose clean(ed) title does not match the title assigned by the classification model and then extracts the features that differ between the users and the group that the users' clean(ed) title says they should be in. As noted, multiple features can be extracted for analysis depending on one or more aspects of functionality (e.g., behavioral features based on OS, services used, network properties, and the like, managerial features based on the number of direct reports, total descendants, and the like, and/or organizational features based on an organizational chart, distance from the root of the organizational tree, and the like).

At 525, the process re-labels the titles. For example, if the difference in feature values is part of an area of functionality that is important and/or relevant to the role of the user, the role level classifier assigned title is designated as the effective title. At 530, the process determines whether the effective title is stable. If the effective title is not stable, the process repeats steps 515, 520, and 525 using the effective title in place of the clean(ed) title (e.g., until the effective title stops changing between runs). If the effective title is stable, the process ends at 535 by reporting the effective title (e.g., to the directory service, to a system administrator, and the like).

Figure 5C:
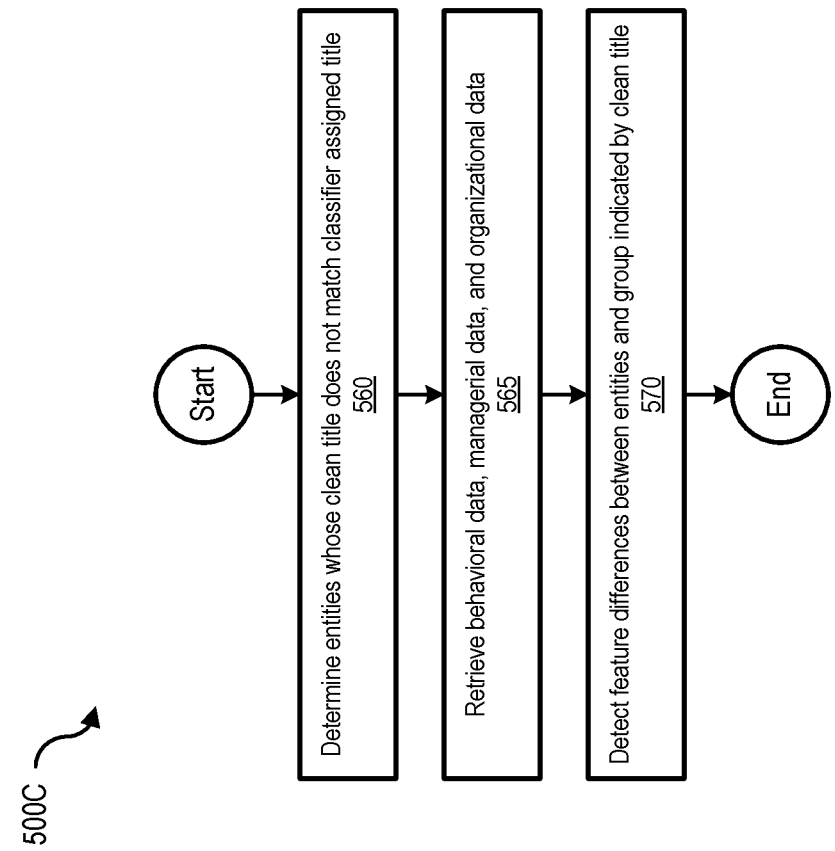
FIG. 5C is a flowchart 500C of a process for detecting feature differences between entities and groups, according to one embodiment of the present disclosure.
Figure 5B:
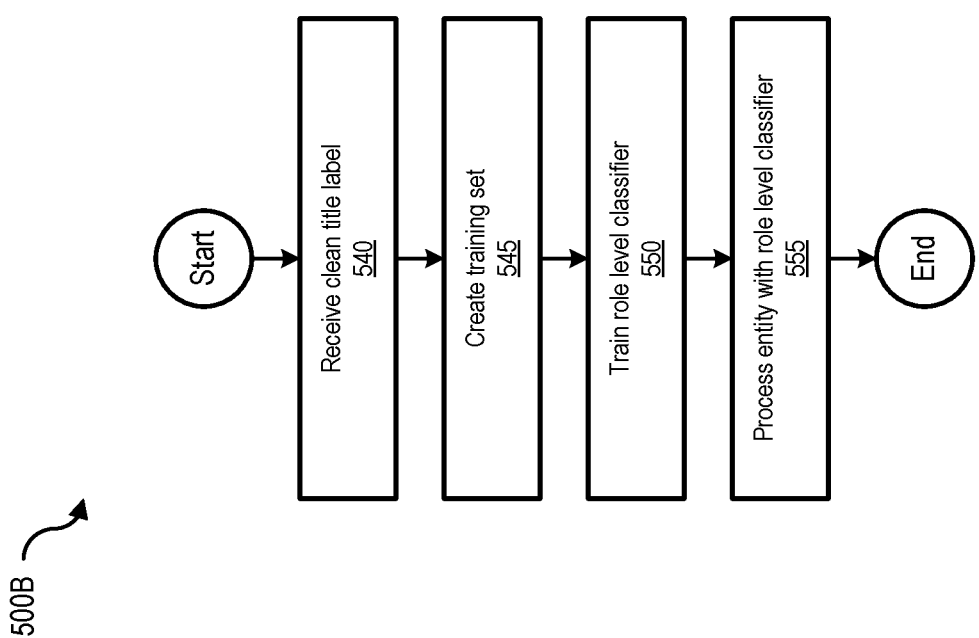
FIG. 5B is a flowchart 500B of a process for processing an entity with a role level classifier, according to one embodiment of the present disclosure.

FIG. 5B is a flowchart 500B of a process for processing an entity with a role level classifier, according to one embodiment. The process begins at 540 by receiving a clean title label (e.g., at RLM server 105 from domain controller 165 or from another computing device that provides user input(s)). At 545, the process creates a training (data) set (e.g., training dataset 335 as shown in FIG. 3B), and at 550, the process trains a role level classifier (e.g., the process creates/generates a role level classifier to classify one or more entities using a binary classification (or other comparable) model). The process ends at 555 by processing the entity with the role level classifier (e.g., to determine whether the classifier-assigned title for the entity matches the original/clean title of the entity).

FIG. 5C is a flowchart 500C of a process for detecting feature differences between entities and groups, according to one embodiment. The process begins at 560 by determining or identifying entities whose clean title does not match (their) classifier assigned title (e.g., identifying outliers 320(1)-(N) using feature extraction engine 115 as shown in FIG. 3A). At 565, the process retrieves (or extracts) behavioral data, managerial data, and organizational data (e.g., behavioral data 210, managerial data 215, and organizational data 220). The process ends at 570 by detecting feature differences (e.g., in one or more areas of functionality) between entities and (the) group indicated by the clean title (for those entities).

Figure 5E:
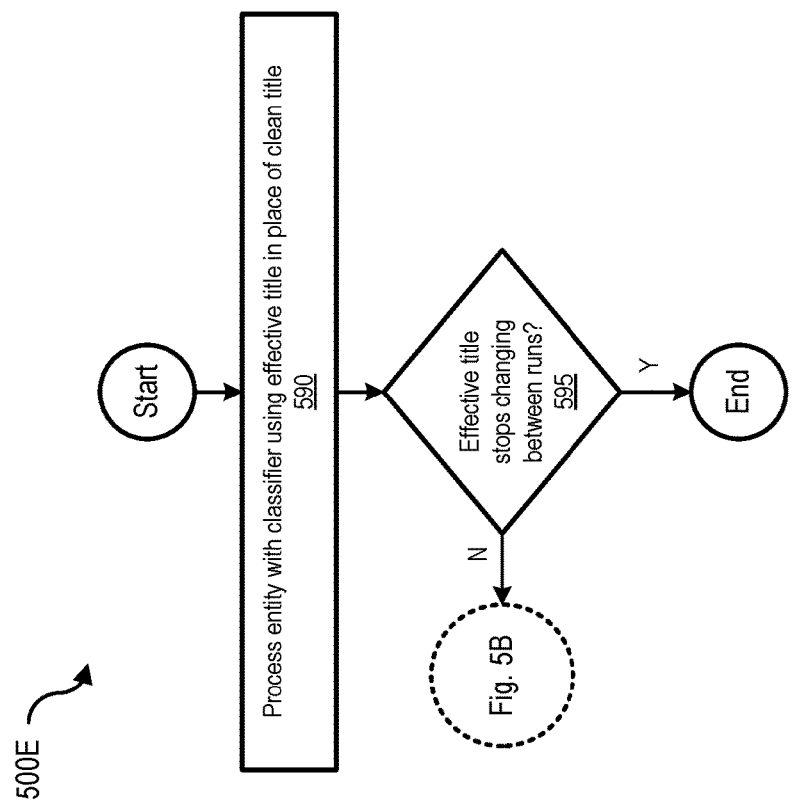
FIG. 5E is a flowchart 500E of a process for processing an entity with a role level classifier, according to one embodiment of the present disclosure.
Figure 5D:
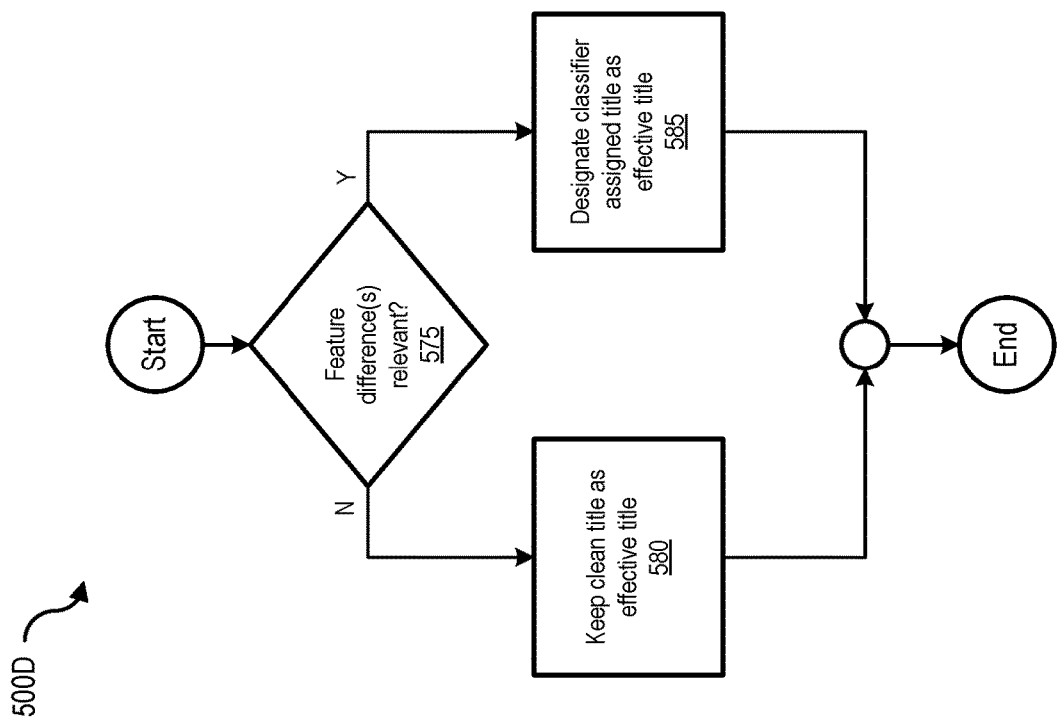
FIG. 5D is a flowchart 500D of a process for assigning an effective title, according to one embodiment of the present disclosure.

FIG. 5D is a flowchart 500D of a process for assigning an effective title, according to one embodiment. The process begins at 575 by determining whether feature differences are relevant. Feature differences can be deemed or designated as relevant based on the role (or to the role) of the user and/or employee that is associated with a given title (e.g., based on one or more aspects and/or areas of functionality that are deemed relevant). For example, behavioral data such as network property data that identifies geospatial log-in information can be deemed relevant to a "Chief" title associated with a globe-trotting executive and irrelevant to a "Support Engineer" title associated with a local employee. Therefore, if feature differences are not deemed relevant, the process, at 580, keeps (or maintains) the clean title as the effective title (e.g., as maintained with respect to entity 305(3) in FIG. 4). However, if feature differences are deemed relevant, the process, at 585, designates the classifier assigned title as the effective title (e.g., as designated with respect to entities 305(1), 305(2), and 305(4) in FIG. 4).

FIG. 5E is a flowchart 500E of a process for processing an entity with a role level classifier, according to one embodiment. The process begins at 590 by processing an entity with a (role level) classifier using an effective title in place of a clean title (e.g., as shown in FIG. 3A). At 595, the process determines whether the effective title stops changing between runs (e.g., whether the latest effective title is the same as the previous effective title or clean title). If the effective title changes (or continues to change) between runs, the process loops to FIG. 5B. However, if the effective title stops changing between runs (e.g., indicating that the effective title(s) have converged and that the (final) effective title has stabilized, as shown in FIG. 3A with respect to effective title 230(3)), the process ends.

Figure 6A:
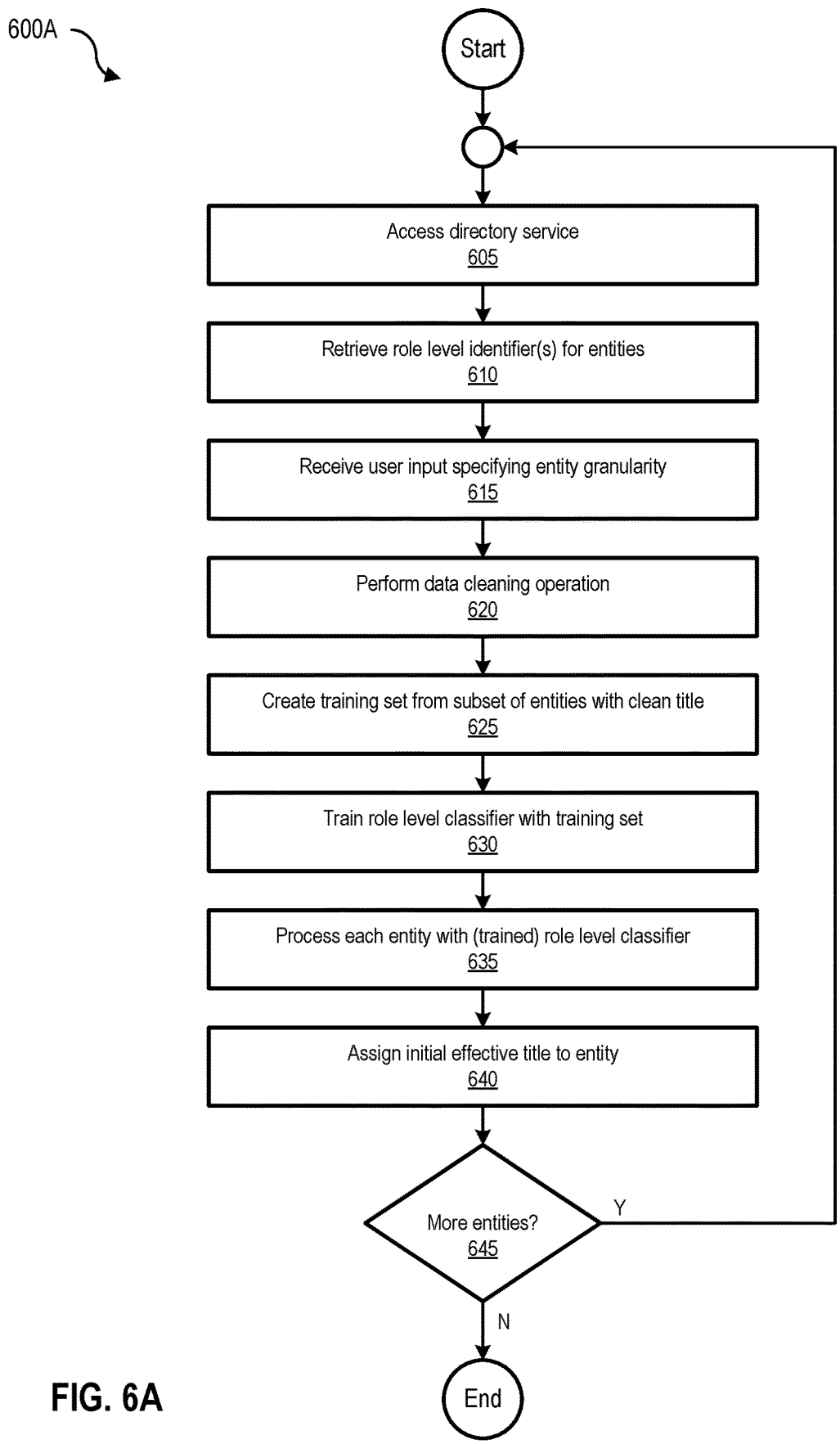
FIG. 6A is a flowchart 600A of a process for assigning an initial effective title to an entity, according to one embodiment of the present disclosure.

FIG. 6A is a flowchart 600A of a process for assigning an initial effective title to an entity, according to one embodiment. The process begins at 605 by accessing a directory service (e.g., directory service 170). At 610, the process retrieves role level identifiers for entities, and at 615, receives user input specifying entity granularity. At 620, the process performs a data cleaning operation (e.g., if the variation between titles that should be same title exceeds a threshold), and at 625, creates a training set from a subset of entities with the clean title (e.g., training dataset 335 as shown in FIG. 3B). At 630, the process trains a role level classifier with the training set (e.g., role level classifier 205 as shown in FIG. 3B). At 635, the process processes each entity with the (trained) role level classifier (e.g., to determine a probability value for the entity and the entity's correlation with various clean titles). At 640, the process assigns an initial effective title to the entity (e.g., effective title 230(1) as shown in FIG. 3A). At 645, the process determines if there are additional entities to process. If there are additional entities to process, the process loops to 605. Otherwise, the process ends.

Figure 6B:
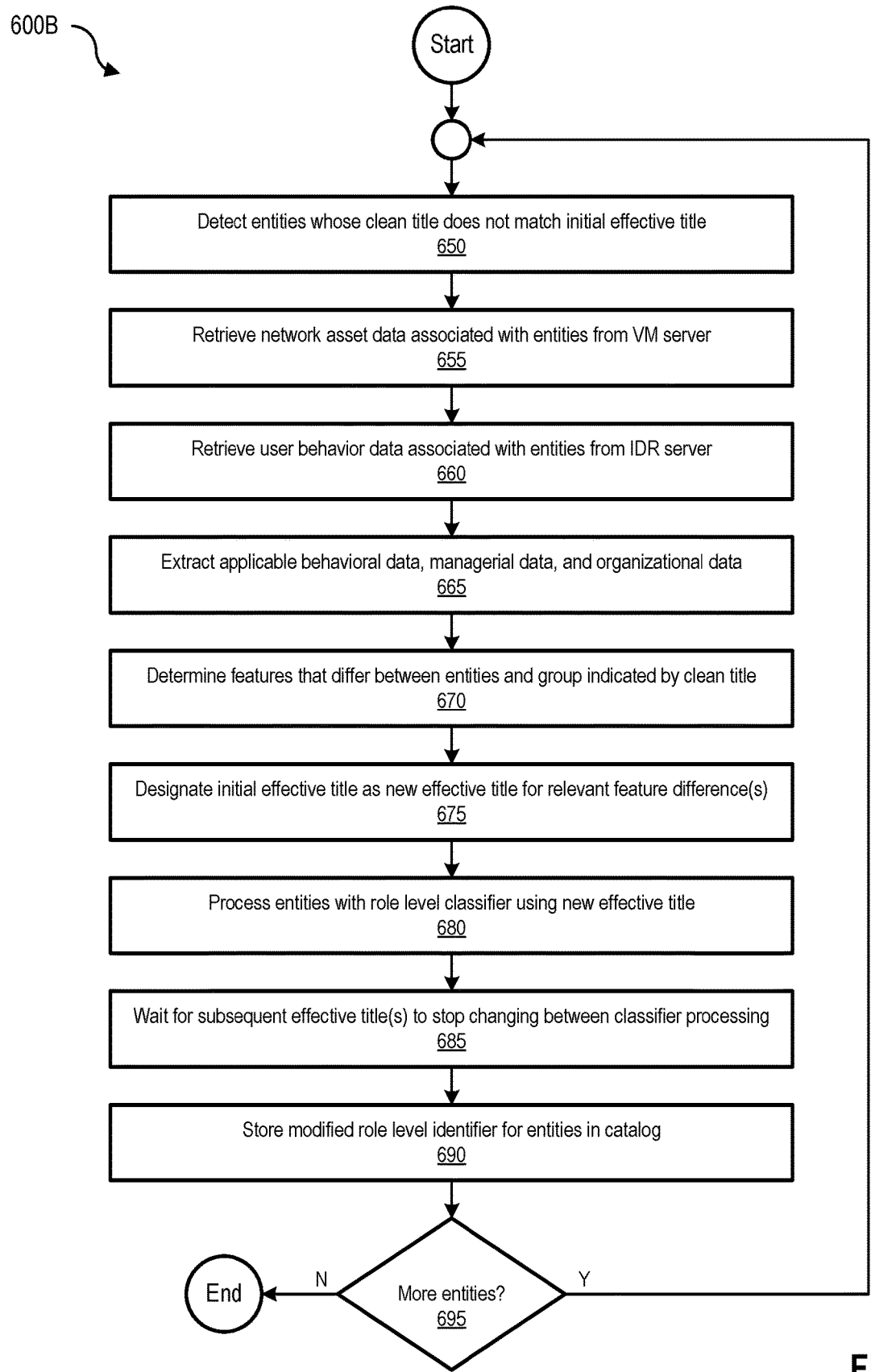
FIG. 6B is a flowchart 600B of a process for storing modified role identifiers, according to one embodiment of the present disclosure.

FIG. 6B is a flowchart 600B of a process for storing modified role identifiers, according to one embodiment. The process begins at 650 by detecting entities whose clean title does not match their initial effective title (e.g., assigned by a (trained) role level classifier). At 655, the process retrieves network asset data (e.g., network asset information 160) associated with the entities from VM server 160. At 660, the process retrieves user behavior data (e.g., user behavior information 150) associated with the entities from IDR server 145. At 665, the process extracts applicable behavioral data 210, managerial data 215, and/or organizational data 220 (e.g., using feature extraction engine 115 implemented by RLM server 105).

At 670, the process determines features that differ between entities and the group (for those entities) indicated by the clean title of the entities, and at 675, designates an initial effective title as a new effective title for the relevant feature differences. For example, feature differences can be identified and designated as relevant based on one or more factors associated with a user and/or employee identified by a given title. Such factors can include but are not limited to role, title, seniority, location, travel patterns, salary, tenure, job performance, demographics, promotions, bonus payments, and the like.

At 680, the process processes entities with the role level classifier using the new effective title, and at 685, waits for subsequent effective titles to stop changing between classifier processing (runs). Waiting for subsequent effective titles from changing permits effective titles to converge and stabilize such that a final effective title that is an accurate role identifier for a given user/employee can be determined. At 690, the process stores a modified role identifier for each entity in a catalog (e.g., as shown in FIG. 3A and in an inverted tree structure that is capable of being hyper-searched to optimize computation processing-based efficiencies). At 695, the process determines if there are more entities to process. If there are more entities to process, the process loops to 650. Otherwise, the process ends.

Figure 7:
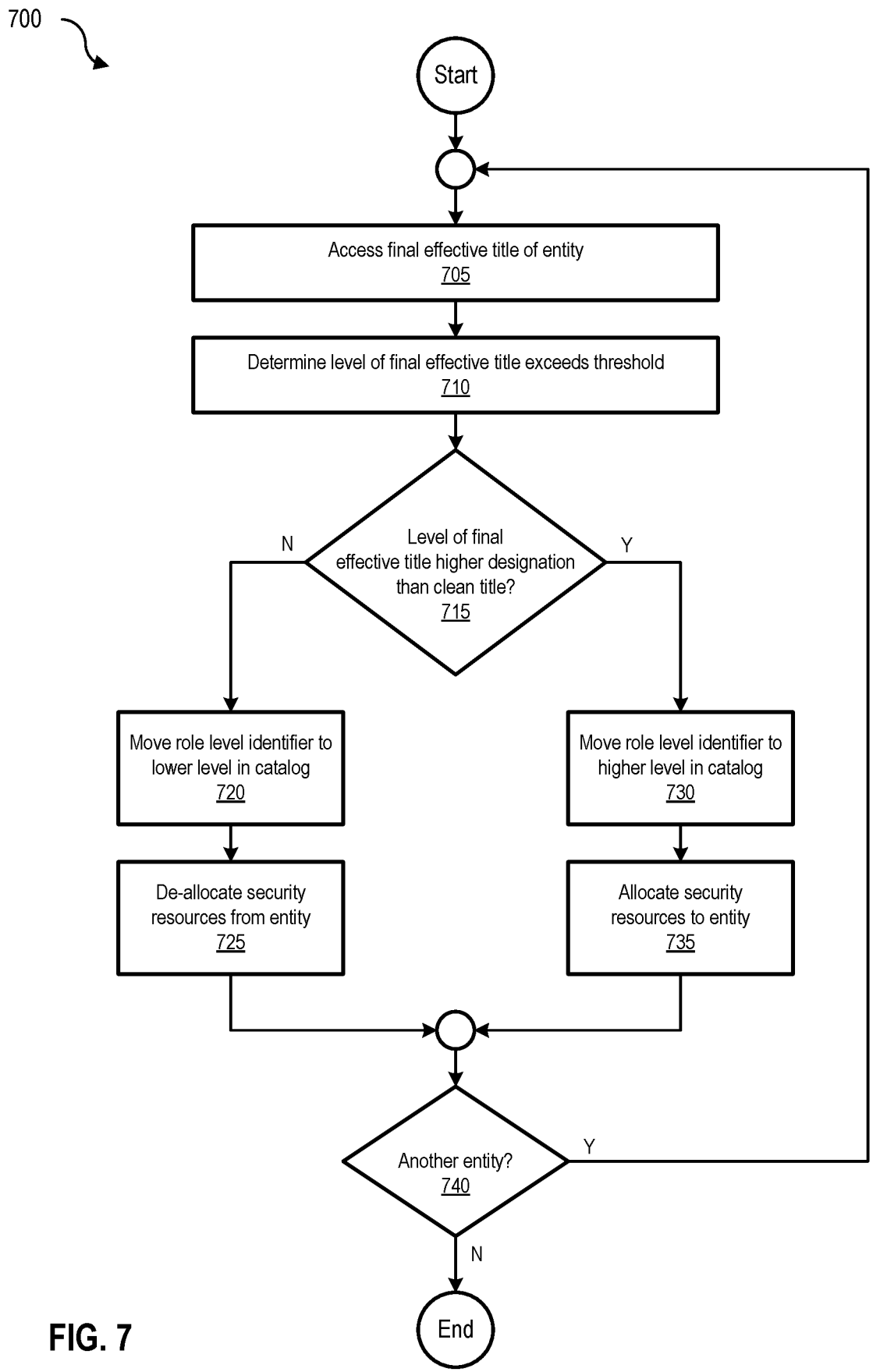
FIG. 7 is a flowchart 700 of a process for allocating computing resources for security operations, according to one embodiment of the present disclosure.

FIG. 7 is a flowchart 700 of a process for allocating computing resources for security operations, according to one embodiment. The process begins at 705 by accessing a final effective title of an entity (e.g., effective title 230(3)/modified role identifier 310 from catalog 315 as shown in FIG. 3A). At 710, the process determines whether a level of the final effective title exceeds a threshold (e.g., by accessing threshold % field 435 in security resource allocation table 405). At 715, the process determines whether the level of the final effective title is a higher designation than the entity's clean title. If the level of the final effective title is not a higher designation than the clean title (e.g., entity 305(2) as shown in FIG. 4), the process, at 720, moves the role level identifier (of the entity) to a lower level in the catalog, and at 725, de-allocates security resources from the entity. However, if the final effective title is a higher designation than the clean title (e.g., entities 305(1), 305(3), and 305(4) as shown in FIG. 4), the process, at 730, moves the role identifier (of the entity) to a higher level in the catalog, and at 735, allocates security resources to the entity. As 740, the process determines if there is another entity to process. If there is another entity to process, the process loops to 705. Otherwise, the process ends.

Example Computing Environment

Figure 8:
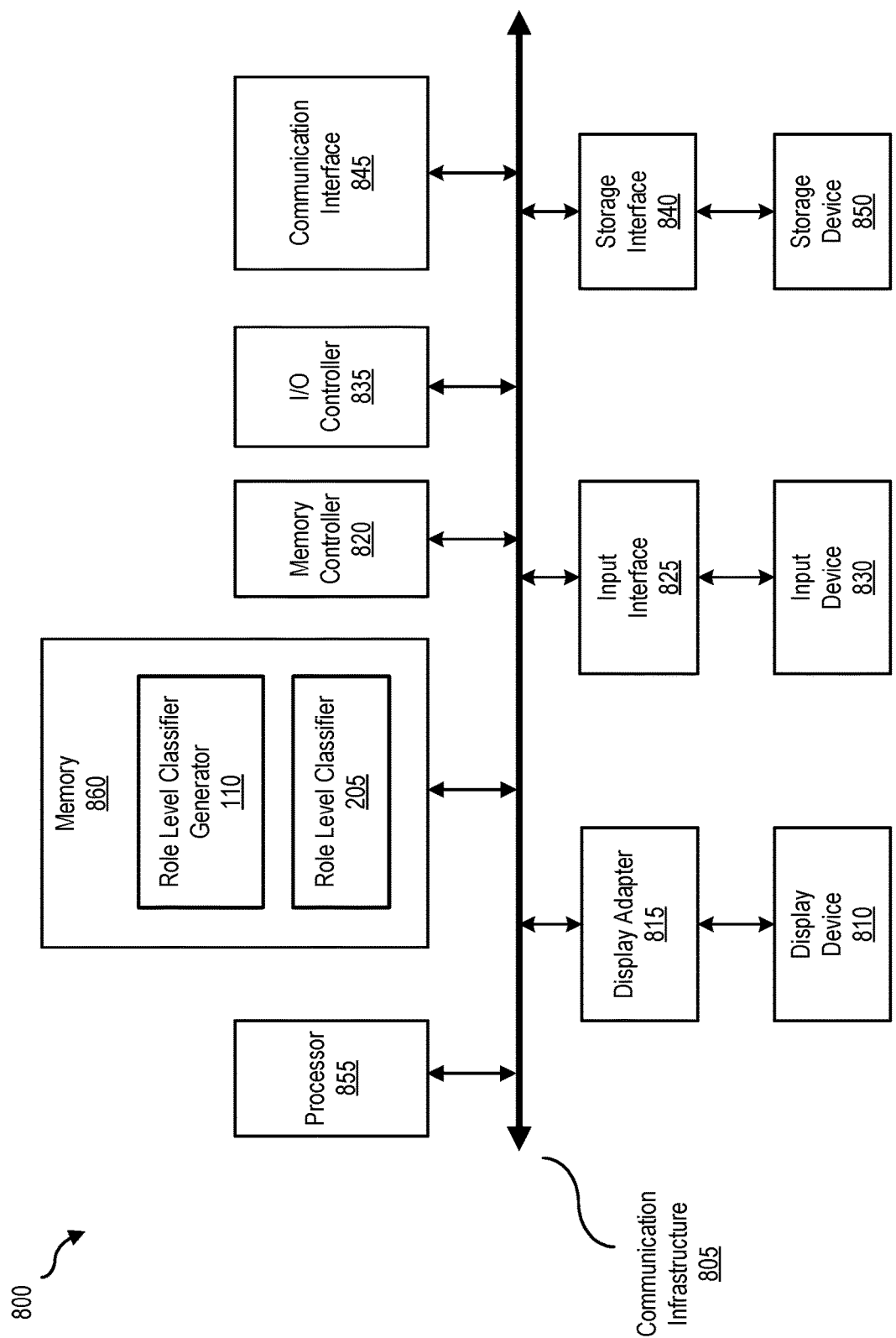
FIG. 8 is a block diagram 800 of a computing system, illustrating how a role level classifier can be implemented in software, according to one embodiment of the present disclosure.

FIG. 8 is a block diagram 800 of a computing system, illustrating how a role level classifier generator and/or a role level classifier can be implemented in software, according to one embodiment. Computing system 800 can include an appliance 115 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes role level classifier generator 110 and/or role level classifier 205, computing system 800 becomes a special purpose computing device that is configured to optimize role level identification for resource allocation.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing role level classifier generator 110 and/or role level classifier 205 may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein. I/O controller 835 generally represents any type or form of module capable of coordinating and/or controlling the input and output functions of an appliance and/or a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type or form of communication device or adapter capable of facilitating communication between computing system 800 and one or more other devices and/or a private or public network including additional computing systems. Examples of communication interface 845 include, without limitation, a wired network interface, a wireless network interface, a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860, and/or various portions of storage device 850, cache 145, and/or backup storage device 165. When executed by processor 855, a computer program loaded into computing system 800 may cause processor 855 to perform and/or be a means for performing the functions of one or more of the embodiments described/illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
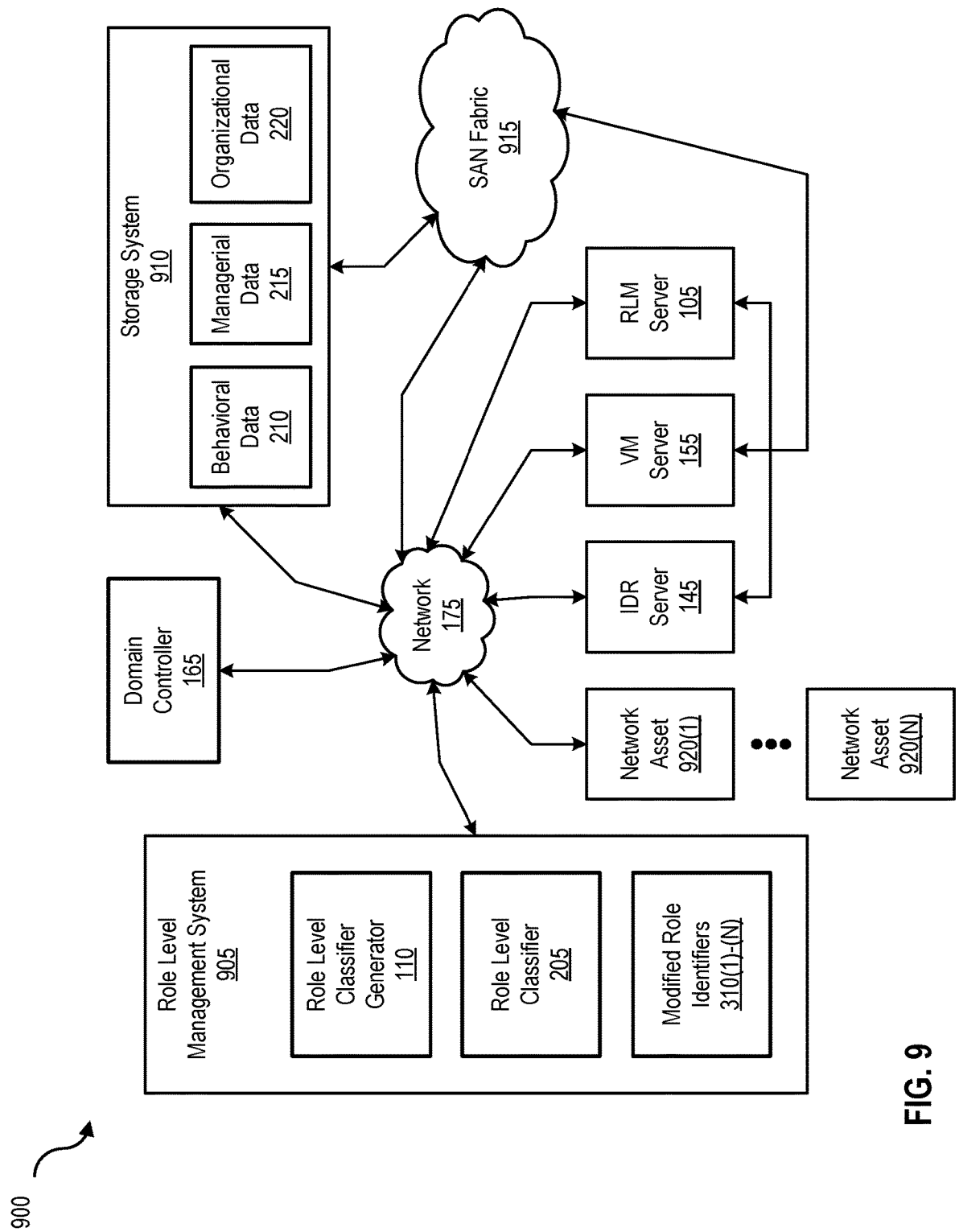
FIG. 9 is a block diagram 900 of a networked system, illustrating how various devices can communicate via a network, according to one embodiment of the present disclosure.

FIG. 9 is a block diagram of a networked system, illustrating how various computing devices can communicate via a network, according to one embodiment. Network 175 generally represents any type or form of computer network or architecture capable of facilitating communication between role level management system 905, IDR server 145, VM server 145, RLM server 105, and network assets 920(1)-(N). In certain embodiments, a communication interface, such as communication interface 845 in FIG. 8, may be used to provide connectivity between role level management system 905, IDR server 145, VM server 145, RLM server 105, and network assets 920(1)-(N), and network 175. The embodiments described and/or illustrated herein are not limited to the Internet or any particular network-based environment. In some embodiments, network 175 can be a Storage Area Network (SAN). In other embodiments, role level classifier generator 110, role level classifier 205, and/or modified role identifiers 310(1)-(N) may be part of appliances role level management system 905, or may be separate (e.g., communicatively coupled via network 175). In one embodiment, all or a portion of one or more of the disclosed embodiments may be encoded as a computer program and loaded onto and executed by RLM server 105 and/or role level management system 905, or any combination thereof. All or a portion of one or more of the embodiments disclosed herein may also be encoded as a computer program, stored on role level management system 905 and/or RLM server 105, and distributed over network 175.

In some examples, all or a portion of role level management system 905 and/or RLM server 105 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment. In addition, one or more of the components described herein may transform data, physical devices, and/or representations of physical devices from one form to another. For example, role level classifier generator 110 and/or role level classifier 205 may transform the behavior of RLM server 105 in order to cause RLM server 105 to optimize role level identification for resource allocation.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
    accessing a training dataset that comprises an entity that is associated with a clean title;
    training a role level classifier to process the entity in the training dataset;
    assigning an initial effective title determined by the role level classifier to the entity;
    re-assigning a new effective title to the entity based on at least a feature difference between the initial effective title and the clean title;
    processing the entity in the training dataset using the new effective title instead of the clean title to generate a final effective title;
    determining whether the final effective title is designated higher than the clean title; and
    allocating one or more security resources to the entity if the final effective title is designated higher than the clean title or de-allocating the one or more security resources from the entity if the final effective title is designated lower than the clean title.

2. The computer-implemented method of claim 1, further comprising:
    continually processing the entity with the trained role level classifier using the new effective title until a subsequent effective title generated for the entity by the role level classifier stops changing.

3. The computer-implemented method of claim 2, further comprising:
    storing a modified role level identifier for the entity in a catalog.

4. The computer-implemented method of claim 3, further comprising:
    maintaining the catalog of a plurality of modified role identifiers that comprises the modified role level identifier independently from a directory service.

5. The computer-implemented method of claim 4, further comprising:
    determining that the modified role identifier matches the new effective title assigned to the entity; and
    the new effective title that is different than the clean title of the entity provided by the directory service.

6. The computer-implemented method of claim 5, further comprising:
    designating the entity and one or more network assets associated with the entity as vulnerable; and
    performing one or more security actions applicable to the entity.

7. A non-transitory computer readable storage medium comprising program instructions executable to comprising program instructions executable to:
    access a training dataset that comprises an entity that is associated with a clean title;
    train a role level classifier to process the entity in the training dataset;
    assign an initial effective title determined by the role level classifier to the entity;
    re-assign a new effective title to the entity based on at least a feature difference between the initial effective title and the clean title;
    process the entity in the training dataset using the new effective title instead of the clean title to generate a final effective title;
    determine whether the final effective title is designated higher than the clean title; and
    allocate one or more security resources to the entity if the final effective title is designated higher than the clean title or de-allocating the one or more security resources from the entity if the final effective title is designated lower than the clean title.

8. The non-transitory computer readable storage medium of claim 7, further comprising:
    continually processing the entity with the trained role level classifier using the new effective title until a subsequent effective title generated for the entity by the role level classifier stops changing.

9. The non-transitory computer readable storage medium of claim 8, further comprising:
storing a modified role level identifier for the entity in a catalog.

10. The non-transitory computer readable storage medium of claim 9, further comprising:
maintaining the catalog of a plurality of modified role identifiers that comprises the modified role level identifier independently from a directory service.

11. The non-transitory computer readable storage medium of claim 10, further comprising:
determining that the modified role identifier matches the new effective title assigned to the entity; and
the new effective title that is different than the clean title of the entity provided by the directory service.

12. The non-transitory computer readable storage medium of claim 11, further comprising:
designating the entity and one or more network assets associated with the entity as vulnerable; and
performing one or more security actions applicable to the entity.

13. A system comprising:
one or more processors; and
a memory coupled to the one or more processors, wherein the memory stores program instructions executable by the one or more processors to:
access a training dataset that comprises an entity that is associated with a clean title;
train a role level classifier to process the entity in the training dataset;
assign an initial effective title determined by the role level classifier to the entity;
re-assign a new effective title to the entity based on at least a feature difference between the initial effective title and the clean title;
process the entity in the training dataset using the new effective title instead of the clean title to generate a final effective title;
determine whether the final effective title is designated higher than the clean title; and
allocate one or more security resources to the entity if the final effective title is designated higher than the clean title or de-allocating the one or more security resources from the entity if the final effective title is designated lower than the clean title.

14. The system of claim 13, further comprising:
continually processing the entity with the trained role level classifier using the new effective title until a subsequent effective title generated for the entity by the role level classifier stops changing.

15. The system of claim 14, further comprising:
storing a modified role level identifier for the entity in a catalog.

16. The system of claim 15, further comprising:
maintaining the catalog of a plurality of modified role identifiers that comprises the modified role level identifier independently from a directory service.

17. The system of claim 16, further comprising:
determining that the modified role identifier matches the new effective title assigned to the entity; and
the new effective title that is different than the clean title of the entity provided by the directory service.

18. The system of claim 17, further comprising:
designating the entity and one or more network assets associated with the entity as vulnerable; and
performing one or more security actions applicable to the entity.

* * * * *